United States Patent
Kim et al.

(10) Patent No.: US 10,224,543 B2
(45) Date of Patent: *Mar. 5, 2019

(54) POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

(71) Applicant: Samsung SDI Co., Ltd., Yongin-si, Gyeonggi-do (KR)

(72) Inventors: Young-Ki Kim, Yongin-si (KR); Na-Ri Park, Yongin-si (KR); Young-Hun Lee, Yongin-si (KR); Soon-Rewl Lee, Yongin-si (KR); Ick-Kyu Choi, Yongin-si (KR); Yong-Chul Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 181 days.

This patent is subject to a terminal disclaimer.

(21) Appl. No.: 14/593,525

(22) Filed: Jan. 9, 2015

(65) Prior Publication Data

US 2015/0228976 A1   Aug. 13, 2015

(30) Foreign Application Priority Data

Feb. 12, 2014 (KR) .................. 10-2014-0016250

(51) Int. Cl.

| | |
|---|---|
| *H01M 4/485* | (2010.01) |
| *C01G 51/00* | (2006.01) |
| *H01M 4/525* | (2010.01) |
| H01M 4/38 | (2006.01) |
| H01M 10/052 | (2010.01) |
| H01M 4/131 | (2010.01) |
| H01M 4/134 | (2010.01) |
| H01M 10/0525 | (2010.01) |

(52) U.S. Cl.
CPC ............ *H01M 4/485* (2013.01); *C01G 51/42* (2013.01); *H01M 4/525* (2013.01); *C01P 2002/54* (2013.01); *C01P 2002/72* (2013.01); *C01P 2004/61* (2013.01); *H01M 4/131* (2013.01); *H01M 4/134* (2013.01); *H01M 4/386* (2013.01); *H01M 10/052* (2013.01); *H01M 10/0525* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 2006/0275667 | A1* | 12/2006 | Watanabe | .......... C01G 45/1228 429/231.3 |
| 2007/0190421 | A1* | 8/2007 | Sato | ....................... C01G 51/42 429/231.3 |
| 2010/0143791 | A1 | 6/2010 | Park et al. | |

FOREIGN PATENT DOCUMENTS

| | | | | |
|---|---|---|---|---|
| EP | 511632 | * | 11/1992 | .............. H01M 4/58 |
| JP | 2008-071623 | A | 3/2008 | |
| KR | 10-2006-0107925 | A | 10/2006 | |
| KR | 10-2008-0100500 | A | 11/2008 | |
| KR | 10-2010-0064631 | A | 6/2010 | |

OTHER PUBLICATIONS

Yu et al. Journal of Power Sources 225, 2013, 34-39 (Oct. 2012).*

* cited by examiner

*Primary Examiner* — Wojciech Haske
(74) *Attorney, Agent, or Firm* — Knobbe, Martens, Olson & Bear, LLP

(57) ABSTRACT

Disclosed are a positive active material for a rechargeable lithium battery including a compound represented $Li_xCo_{1-y}Ti_yO_2$, wherein $1<x\le1.1$ and $0.02\le y\le0.05$; a method of preparing the same; and a rechargeable lithium battery including the same.

12 Claims, 3 Drawing Sheets

POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

RELATED APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2014-0016250 filed in the Korean Intellectual Property Office on Feb. 12, 2014, the disclosure of which is incorporated herein by reference in its entirety.

BACKGROUND

Field

This disclosure relates to a positive active material for a rechargeable lithium battery, a method of preparing the same, and a rechargeable lithium battery including the same.

Description of the Related Technology

Due to the reduction in size and weight of portable electronics in recent years, there has been a need to develop rechargeable lithium batteries having both high performance and large capacity.

Various carbon-based materials such as artificial graphite, natural graphite, and hard carbon that may intercalate and deintercalate have been previously used as negative active materials for rechargeable lithium battery. Recently, a non-carbon-based negative active material such as Silicon (Si) has been researched for better stability and high-capacity.

In addition, as for the positive active material, an oxide consisting of lithium and a transition metal, which has a structure capable of intercalating lithium ions, for example, $LiCoO_2$, $LiMn_2O_4$, $LiNi_{1-x}Co_xO_2$ ($0<x<1$), and the like, is commonly used. However, researches have been performed on various other new active materials to develop batteries with high-capacity and high power.

SUMMARY OF CERTAIN INVENTIVE ASPECTS

One embodiment provides a positive active material for a rechargeable lithium battery having high-capacity and excellent cycle-life and high power characteristics.

Another embodiment provides a method of preparing the positive active material for a rechargeable lithium battery.

Yet another embodiment provides a rechargeable lithium battery including the positive active material for a rechargeable lithium battery.

One aspect of the present disclosure relates to a positive active material for a rechargeable lithium battery, including a compound represented by the following Chemical Formula 1:

$$Li_xCo_{1-y}Ti_yO_2 \quad \text{[Chemical Formula 1]}$$

wherein $1<x\le1.1$ and $0.02\le y\le0.05$.

In some embodiments, x is $1.03\le x\le1.1$ and y is $0.03\le y\le0.05$.

In some embodiments, the compound represented by the above Chemical Formula 1 is a particle having an average particle diameter (D50) in the range of about 3 μm to about 17 μm.

In some embodiments, the compound represented by the above Chemical Formula 1 is a particle having an average particle diameter (D50) in the range of about 3 μm to about 7 μm.

In some embodiments, the compound represented by the above Chemical Formula 1 is a particle having an average particle diameter (D50) of about 5 μm.

In some embodiments, the compound represented by the above Chemical Formula 1 is a particle having an average particle diameter (D50) in the range of about 13 μm to about 17 μm.

In some embodiments, the positive active material further comprises a lithium metal compound that is different from the compound represented by the Chemical Formula 1.

In some embodiments, the lithium metal compound has an amount in the range of about 50 wt % to about 95 wt % based on the total amount of the positive active material.

In some embodiments, the compound represented by the above Chemical Formula 1 is $Li_{1.069}Co_{0.98}Ti_{0.02}O_2$.

In some embodiments, the compound represented by the above Chemical Formula 1 is $Li_{1.087}Co_{0.961}Ti_{0.039}O_2$.

In some embodiments, the positive active material is a mixture of $Li_{1.069}Co_{0.98}Ti_{0.02}O_2$ and $Li_{1.05}CoO_2$ mixed at a weight ratio of 8:2.

In some embodiments, the positive active material is a mixture of $Li_{1.087}Co_{0.961}Ti_{0.039}O_2$ and $Li_{1.05}CoO_2$ mixed at a weight ratio of 8:2.

Another aspect of the present disclosure relates to a method of preparing a positive active material for a rechargeable lithium battery, including mixing a lithium-containing material, a titanium-containing material, and a cobalt-containing material to obtain a mixture; and heat-treating the mixture at a temperature of greater than or equal to about 1000° C. to prepare the compound represented by Chemical Formula 1:

$$Li_xCo_{1-y}Ti_yO_2 \quad \text{[Chemical Formula 1]}$$

wherein $1<x\le1.1$ and $0.02\le y\le0.05$.

In some embodiments, the process of the heat-treating is performed at a temperature in the range of about 1050° C. to about 1090° C.

In some embodiments, the process of the heat-treating is performed at a temperature of about 1070° C.

In some embodiments, the process of the heat-treating is performed for about 10 hours to about 24 hours.

In some embodiments, the process of the heat-treating is performed for about 10 hours.

In some embodiments, the process of the heat-treating is performed under an air atmosphere.

One additional aspect of the present disclosure relates to a rechargeable lithium battery, comprising the positive electrode including a positive active material of claim 1;

a negative electrode including a negative active material; and an electrolyte solution.

In some embodiments, the negative active material comprises a silicon-based material.

DETAILED DESCRIPTION OF CERTAIN INVENTIVE EMBODIMENTS

Figure 1:
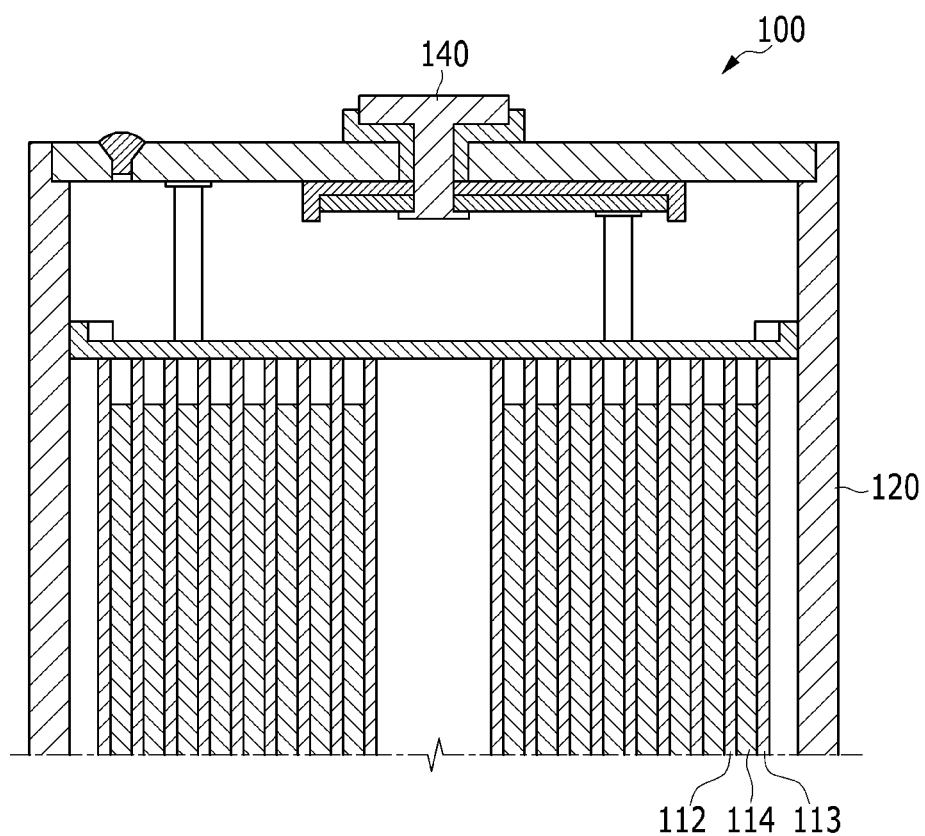
FIG. 1 is a schematic view showing an example of a rechargeable lithium battery.

Hereinafter, embodiments are described in detail. However, these embodiments are exemplary, and this disclosure is not limited thereto.

A positive active material for a rechargeable lithium battery according to one embodiment includes a compound represented by the following Chemical Formula 1.

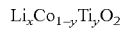  [Chemical Formula 1]

$Li_xCo_{1-y}Ti_yO_2$

In the above Chemical Formula 1, $1<x\leq1.1$, and specifically $1.03\leq x\leq1.1$, and $0.02\leq y\leq0.05$, and specifically $0.03\leq y\leq0.05$.

In the above Chemical Formula 1, when x and y are respectively within the range, high initial charge capacity and low initial charge and discharge efficiency may be obtained. For example, the compound represented by the above Chemical Formula 1 shows initial charge capacity of about 200 mAh/g, while a conventional lithium cobalt composite metal oxide shows initial charge capacity of about 185 mAh/g at about 4.35 V. In addition, the compound represented by the above Chemical Formula 1 has a low phase transition voltage and initial charge and discharge efficiency of less than or equal to about 90% compared with the conventional lithium cobalt composite metal oxide and may be more usefully applied to a rechargeable lithium battery system including a negative electrode using a silicon-based material having high irreversibility.

In some embodiments, the compound represented by the above Chemical Formula 1 may form a particle having an average particle diameter (D50) of about 3 μm to about 17 μm, specifically, a small particle having an average particle diameter (D50) of about 3 μm to about 7 μm, or a large particle having an average particle diameter (D50) of about 13 μm to about 17 μm. The small particle having an average particle diameter (D50) of about 3 μm to about 7 μm may be advantageous. In some embodiments, the large particle having an average particle diameter (D50) of about 5 μm to about 17 μm, of about 10 μm to about 17 μm, of about 12 μm to about 17 μm, and of about 15 μm to about 17 μm. In some embodiments, the small particle having an average particle diameter (D50) of about 3 μm to about 6.5 μm, of about 3 μm to about 6 μm, of about 3 μm to about 5.5 μm, of about 3 μm to about 5 μm, of about 3 μm to about 4.5 μm, and of about 3 μm to about 4 μm. In some embodiments, the small particle having an average particle diameter (D50) of about 3 μm, about 4 μm, about 5 μm, about 6 μm, about μm, about 7 μm, about 8 μm, or any combinations thereof. When the compound represented by the above Chemical Formula 1 is a particle having an average particle diameter within the range, the compound may be easily decomposed and thus, sufficiently provides lithium but does not increase resistance.

In some embodiments, the compound represented by the above Chemical Formula 1 may be prepared by a method that includes mixing a lithium-containing material, a titanium-containing material, and a cobalt-containing material to obtain a mixture; and heat-treating the mixture at a temperature of greater than or equal to about 1000° C.

In some embodiments, the lithium-containing material may be a lithium-containing oxide such as $Li_2O$, a lithium-containing hydroxide such as LiOH, a lithium-containing carbonate salt such as $Li_2CO_3$, or a combination thereof.

In some embodiments, the titanium-containing material may be a titanium-containing oxide such as $TiO_2$, a metal salt, a hydrate thereof, and the like. Examples of the metal salt may be hydroxide, nitrate, acetate, and the like.

In some embodiments, the cobalt-containing material may be a cobalt-containing oxide, a metal salt, a hydrate thereof, and the like. Specifically, the cobalt-containing material may be CoO, $Co_3O_4$, $Co(OH)_2$, $Co(OH)_3$, $Co(NO_3)_2 \cdot pH_2O$ ($1 \leq p \leq 7$), $Co(COOCH_3)_2$, or a combination thereof.

The lithium-containing material, the titanium-containing material, and the cobalt-containing material may be mixed in an appropriate mole ratio, considering the amounts of lithium, titanium and cobalt in the compound represented by Chemical Formula 1 as a final product.

The lithium-containing material, the titanium-containing material and the cobalt-containing material may be mixed using a general method such as dry mixing, wet mixing, and any other suitable methods known in the art.

In some embodiments, the mixture may be heat-treated at a temperature of greater than or equal to about 1000° C. and specifically, about 1050° C. to about 1090° C. under an air atmosphere. When the heat treatment is performed at the temperature under the atmosphere, the compound represented by the above Chemical Formula 1 may be made with a high purity and high yield. In addition, when the heat treatment is performed at a high temperature, a part of cobalt is substituted with titanium in the lithium cobalt oxide.

The heat treatment may be performed for greater than or equal to about 10 hours and specifically, about 10 hours to about 24 hours. In some embodiments, the heat treatment may be performed for about 10 hours to about 20 hours, about 10 hours to about 15 hours, about 12 hours to about 24 hours, about 14 hours to about 24 hours, about 18 hours to about 24 hours, about 20 hours to about 24 hours. In some embodiments, the heat treatment may be performed for about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, or any combinations thereof. When the heat treatment is performed within the range, the reaction may sufficiently occur and minimize formation of impurities including the non-reactant such as $Li_2O$, Co, and the like. Therefore, the reaction can provide the compound represented by the above Chemical Formula 1 with a high yield. Accordingly, usable lithium ions may be further provided.

In this way, the positive active material is prepared by substituting a part of the cobalt therein with a large amount of titanium. Therefore, the battery containing the type of positive active material shows excellent capacity and cycle-life characteristics during charge and discharge and excellent stability, and the battery has both high power and high-capacity.

In some embodiments, the rechargeable lithium battery can include the positive electrode having a positive active material, a negative electrode having a negative active material, and an electrolyte solution.

The rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on the shape. In addition, it may be a bulk type or a thin film type depending on the size. Structures and manufacturing methods for lithium ion batteries described herein include any suitable structures and manufacturing methods known in the art.

FIG. 1 is an exploded perspective view showing an example of a rechargeable lithium battery.

Referring to FIG. 1, the rechargeable lithium battery 100 includes a negative electrode 112, a positive electrode 114, a separator 113 interposed between the negative electrode 112 and the positive electrode 114, an electrolyte (not shown) impregnating the negative electrode 112, the positive electrode 114, and the separator 113, a battery case 120, and a sealing member 140 sealing the battery case 120. The rechargeable lithium battery 100 is fabricated by sequentially laminating the negative electrode 112, the positive electrode 114, and the separator 113, spirally winding them, and housing the spiral-wound product in the battery case 120.

In some embodiments, the positive electrode 114 includes a current collector and a positive active material layer formed on the current collector.

In some embodiments, the positive active material may include a compound represented by the above Chemical Formula 1.

In some embodiments, the positive active material may be used with a lithium metal compound that is different from the compound represented by the above Chemical Formula 1.

The lithium metal compound may be a compound being capable of intercalating and deintercallating lithium. In some embodiments, at least one composite oxide of lithium and a metal of cobalt, manganese, nickel, or a combination thereof may be used. In some embodiments, the lithium metal compound can be represented by one of the following Chemical Formulae: $Li_aA_{1-b}R_bD^1_2$ (wherein, in the above chemical formula, $0.90 \leq a \leq 1.8$ and $0 \leq b \leq 0.5$); $Li_aE_{1-b}R_b O_{2-c}D^1_c$ (wherein, in the above chemical formula, $0.90 \leq a \leq 1.8$, $0 \leq b \leq 0.5$ and $0 \leq c \leq 0.05$); $LiE_{2-b}R_bO_{4-c}D^1_c$ (wherein, in the above chemical formula, $0 \leq b \leq 0.5$, $0 \leq c \leq 0.05$); $Li_aNi_{1-b-c}Co_bR_cD^1_\alpha$ (wherein, in the above chemical formula, $0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z^1_\alpha$ (wherein, in the above chemical formula, $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z^1_2$ (wherein, in the above chemical formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cD^1_\alpha$ (wherein, in the above chemical formula, $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z^1_\alpha$ (wherein, in the above chemical formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z^1_2$ (wherein, in the above chemical formula, $0.90 \leq a \leq 1.8$, $0 \leq b \leq 0.5$, $0 \leq c \leq 0.05$ and $0 \leq \alpha \leq 2$); $Li_aNi_bE_cG_dO_2$ (wherein, in the above chemical formula, $0.90 \leq a \leq 1.8$, $0 \leq b \leq 0.9$, $0 \leq c \leq 0.5$ and $0.001 \leq d \leq 0.1$); $Li_aNi_bCo_cMn_d GeO_2$ (wherein, in the above chemical formula, $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ (wherein, in the above chemical formula, $0.90 \leq a \leq 1.8$ and $0.001 \leq b \leq 0.1$); $Li_aCoG_bO_2$ (wherein, in the above chemical formula, $0.90 \leq a \leq 1.8$ and $0.001 \leq b \leq 0.1$); $Li_aMnG_bO_2$ (wherein, in the above chemical formula, $0.90 \leq a \leq 1.8$ and $0.001 \leq b \leq 0.1$); $Li_aMn_2G_bO_4$ (wherein, in the above chemical formula, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae for the lithium metal compound, A is Ni, Co, Mn, or a combination thereof; R is Al, Ni, Co, Mn, Cr, Fe, Mg, Sr, V, a rare earth element, or a combination thereof; $D^1$ is O, F, S, P, or a combination thereof; E is Co, Mn, or a combination thereof; $Z^1$ is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

In some embodiments, the lithium metal compound may include the lithium metal compound with the coating layer, or a mixture of the compound and the compound with the coating layer. The coating layer may include a coating element compound of an oxide or hydroxide of a coating element, oxyhydroxide of a coating element, oxycarbonate of a coating element, or hydroxycarbonate of a coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any conventional processes as long as it does not causes any side effects on the properties of the positive active material (e.g., spray coating, immersing), which is well known to persons having ordinary skill in this art, so a detailed description thereof is omitted.

When the positive active material includes the compound represented by the above Chemical Formula 1 and the lithium metal compound, the lithium metal compound may be used in an amount of about 50 wt % to about 95 wt % based on the total amount of the positive active material. In some embodiments, the lithium metal compound can be used in an amount in the range of about 50 wt % to about 90 wt %, about 50 wt % to about 80 wt %, about 50 wt % to about 70 wt %, about 50 wt % to about 60 wt %, about 60 wt % to about 95 wt %, about 70 wt % to about 95 wt %, about 80 wt % to about 95 wt %, based on the total amount of the positive active material. In some embodiments, the lithium metal compound can be used in an amount of about 50 wt %, about 60 wt %, about 70 wt %, about 80 wt %, about 90 wt %, about 95 wt %, or any combinations thereof.

The positive active material layer may further include a binder and a conductive material.

The binder for the positive active material improves binding properties of positive active material particles with one another and with a current collector. In some embodiments, the binder canbe polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material improves conductivity of an electrode. Any electrically conductive material may be used as a conductive material, unless it causes a chemical change. Examples thereof may be one or more of natural graphite, artificial graphite, carbon black, acetylene black, ketjen black, a carbon fiber, a metal powder, a metal fiber, and the like of copper, nickel, aluminum, silver, and the like, or a polyphenylene derivative and the like.

The current collector may use Al, but is not limited thereto.

The negative electrode 112 includes a current collector and a negative active material layer formed on the current collector, and the negative active material layer includes a negative active material.

In some embodiments, the negative active material includes a material that reversibly intercalates/deintercalates lithium ions, lithium metal, lithium metal alloy, material being capable of doping and dedoping lithium, or transition metal oxide.

The material that reversibly intercalates/deintercalates lithium ions may be a carbon material, and may be any generally-used carbon-based negative active material in a rechargeable lithium ion rechargeable battery. Examples thereof may be crystalline carbon, amorphous carbon, or a combination thereof. The crystalline carbon may be non-shaped, or may be sheet, flake, spherical, or fiber shaped natural graphite or artificial graphite. The amorphous carbon may be a soft carbon (a carbon obtained by sintering at a low temperature), a hard carbon, mesophase pitch carbonized products, fired coke, and the like.

In some embodiments, the lithium metal alloy may be an alloy of lithium and a metal of Na, K, Rb, Cs, Fr, Be, Mg, Ca, Sr, Si, Sb, Pb, In, Zn, Ba, Ra, Ge, Al, and Sn.

The material being capable of doping and dedoping lithium may be a silicon-based material, a tin-based material, and the like. The silicon-based material may include Si, $SiO_x$ ($0<x<2$), a Si—$X_1$ alloy (wherein $X_1$ is an alkali metal, an alkaline-earth metal, Group 13 to 16 elements, a transition metal, a rare earth element, or a combination thereof, and not Si), and the tin-based material may include Sn, $SnO_2$, a Sn—$X_2$ alloy (wherein $X_2$ is an alkali metal, an alkaline-earth metal, Group 13 to 16 elements, transition metal, a rare earth element, or a combination thereof, and not Sn), and the like. At least one thereof may be used with $SiO_2$. Specific element of the $X_1$ and $X_2$ may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may be vanadium oxide, lithium vanadium oxide, and like.

The negative active material may be the silicon-based material.

The negative active material layer may further include a binder, and optionally a conductive material.

The binder for the negative active material improves binding properties of negative active material particles with one another and with a current collector. Examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material for the negative electrode improves electrical conductivity of an electrode. Any electrically conductive material may be used as a conductive material, unless it causes a chemical change. Examples thereof may be a carbon-based material such as natural graphite, artificial graphite, carbon black, acetylene black, ketjen black, a carbon fiber and the like; a metal-based material such as a metal powder, a metal fiber, and the like of copper, nickel, aluminum, silver, and the like; a conductive polymer such as a polyphenylene derivative and the like; or a mixture thereof.

The current collector for the negative electrode may be a copper foil, a nickel foil, a stainless steel foil, a titanium foil, a nickel foam, a copper foam, a polymer substrate coated with a conductive material, or a combination thereof.

The negative electrode may be manufactured by a method including mixing the negative active material, the binder, and the conductive material in a solvent to prepare a negative active material composition, and coating the negative active material composition on the negative current collector. Herein, the solvent includes N-methylpyrrolidone and the like, but is not limited thereto.

The electrolyte solution includes a non-aqueous organic solvent and a lithium salt.

The non-aqueous organic solvent serves as a medium for transmitting ions taking part in the electrochemical reaction of a battery. The non-aqueous organic solvent may include a carbonate-based, ester-based, ether-based, ketone-based, alcohol-based, or aprotic solvent.

The carbonate-based solvent may include, for example dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and any combinations thereof.

In some embodiments, when a linear carbonate compound and a cyclic carbonate compound are mixed, a solvent having a high dielectric constant and a low viscosity may be provided. Herein, the cyclic carbonate compound and linear carbonate compound may be mixed together in a volume ratio ranging from about 1:1 to about 1:9.

The ester-based solvent may include, for example methylacetate, ethylacetate, n-propylacetate, dimethylacetate, methylpropionate, ethylpropionate, γ-butyrolactone, decanolide, valerolactone, mevalonolactone, caprolactone, and the like. The ether-based solvent may include, for example dibutylether, tetraglyme, diglyme, dimethoxyethane, 2-methyltetrahydrofuran, tetrahydrofuran, and the like, and the ketone-based solvent may include cyclohexanone, and the like. The alcohol-based solvent may include ethyl alcohol, isopropyl alcohol, and the like.

The non-aqueous organic solvent may be used singularly or in a mixture, and when the organic solvent is used in a mixture, the mixture ratio may be controlled in accordance with a desirable battery performance.

In some embodiments, the non-aqueous electrolyte may further include an overcharge inhibitor additive such as ethylenecarbonate, pyrocarbonate, or the like.

The lithium salt is dissolved in an organic solvent, supplies lithium ions in a battery, basically operates the rechargeable lithium battery, and improves lithium ion transportation between positive and negative electrodes therein.

In some embodiments, the lithium salt may be $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, LiN LiN($C_xF_{2x+1}SO_2$)($C_yF_{2y+1}SO_2$), wherein, x and y are natural numbers, LiCl, La, $LiB(C_2O_4)_2$ (lithium bis(oxalato) borate, LiBOB), or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The separator 113 may include any materials commonly used in the conventional lithium battery as long as separating a negative electrode from a positive electrode and providing a transporting passage of lithium ion. In other words, it may have a low resistance to ion transport and an excellent impregnation capacity for electrolyte. In some embodiments, the separator may be selected from glass fiber, polyester, TEFLON (tetrafluoroethylene), polyethylene, polypropylene, polytetrafluoroethylene (PTFE), or a combination thereof. In some embodiments, the separator may have a form of a non-woven fabric or a woven fabric. For example, for the lithium ion battery, polyolefin-based polymer separator such as polyethylene, polypropylene or the like is mainly used. In order to ensure the heat resistance and/or mechanical strength, a coated separator including a ceramic component or a polymer material may be used. Selectively, it may have a mono-layered or multi-layered structure.

Hereinafter, the embodiments are illustrated in more detail with reference to examples. However, these examples are exemplary, and the present disclosure is not limited thereto. Furthermore, what is not described in this disclosure may be sufficiently understood by those who have knowledge in this field and will not be illustrated here.

Preparation of Positive Active Material

PREPARATION EXAMPLE 1

The positive active material of $Li_{1.069}Co_{0.98}Ti_{0.20}O_2$ having an average particle diameter (D50) of 5 μm was prepared by uniformly mixing 32.99 g of $Li_2CO_3$, 1.35 g of $TiO_2$, and 65.66 g of $Co_3O_4$ and heat-treating the mixture at 1070° C. for 10 hours under a pure air atmosphere.

PREPARATION EXAMPLE 2

The positive active material of $Li_{1.087}Co_{0.961}Ti_{0.039}O_2$ having an average particle diameter (D50) of 5 μm was prepared by uniformly mixing 33.36 g of $Li_2CO_3$, 2.60 g of $TiO_2$, and 64.04 g of $Co_3O_4$ and heat-treating the mixture at 1070° C. for 10 hours under a pure air atmosphere.

COMPARATIVE PREPARATION EXAMPLE 1

$Li_{1.05}CoO_2$ having an average particle diameter (D50) of 15 μm was prepared by uniformly mixing 32.58 g of $Li_2CO_3$ and 67.42 g of $Co_3O_4$ and heat-treating the mixture at 1050° C. for 10 hours under a pure air atmosphere. Subsequently, the $Li_{1.05}CoO_2$ was surface-treated with 0.05 parts by weight of aluminum isopropoxide based on 100 parts by weight of the $Li_{1.05}CoO_2$ and heat-treated at 750° C. for 5 hours to producea positive active material.

COMPARATIVE PREPARATION EXAMPLE 2

$Li_{1.05}CoO_2$ having an average particle diameter (D50) of 5 μm was prepared by uniformly mixing 32.58 g of $Li_2CO_3$ and 67.42 g of $Co_3O_4$ and heat-treating the mixture at 950° C. for 10 hours under a pure air atmosphere. Subsequently, the $Li_{1.05}CoO_2$ was surface-treated with 0.05 parts by weight of aluminum isopropoxide based on 100 parts by weight of the $Li_{1.05}CoO_2$ and heat-treated at 750° C. for 5 hours to produce a positive active material.

Manufacture of Rechargeable Lithium Battery Cell

EXAMPLE 1

Positive active material slurry was prepared by dissolving a fluoride binder (Guerra, Inc.) in a N-methyl-2-pyrrolidone solvent and adding the positive active material in accordance with the steps in Preparation Example 1 with carbon black as a conductive material. Herein, the positive active material, the conductive material, and the binder were mixed in a weight ratio of 96:2:2. The slurry was coated on an aluminum foil and dried at 130° C. for 20 minutes, manufacturing a positive electrode.

The positive electrode, a lithium metal as a counter electrode, and a polyethylene separator were used to manufacture a half-cell. Herein, an electrolyte solution was prepared by mixing ethylene carbonate, dimethyl carbonate and diethyl carbonate in a volume ratio of 3:4:3 and dissolving 1.15 M $LiPF_6$ in the mixed solvent.

EXAMPLE 2

A half-cell was manufactured according to the same method as Example 1 except for using the positive active material made in Preparation Example 2 instead of the positive active material made in Preparation Example 1.

EXAMPLE 3

A half-cell was manufactured according to the same method as Example 1 except for using a mixture obtained by mixing the positive active material of Example 1 and the positive active material of Preparation Example 1 in a weight ratio of 8:2 instead of the positive active material of Preparation Example 1.

EXAMPLE 4

A half-cell was manufactured in accordance with the same method described in Example 1 except for using a mixture obtained by mixing the positive active material of Example 2 and the positive active material of Preparation Example 1 in a weight ratio of 8:2 instead of the positive active material of Preparation Example 1.

COMPARATIVE EXAMPLE 1

A half-cell was manufactured in accordance with the same method described in Example 1 except for using the positive active material of Comparative Preparation Example 1 instead of the positive active material of Preparation Example 1.

COMPARATIVE EXAMPLE 2

A half-cell was manufactured in accordance with the same method described in Example 1 except for using the positive active material of Comparative Preparation Example 2 instead of the positive active material of Preparation Example 1.

COMPARATIVE EXAMPLE 3

A half-cell was manufactured in accordance with the same method described in Example 1 except for using a mixture obtained by mixing the positive active material of Comparative Preparation Example 1 and the positive active material of Comparative Preparation Example 2 in a weight ratio of 8:2 instead of the positive active material of Preparation Example 1.

Evaluation 1: XRD Analysis of Positive Active Material

X-ray diffraction analysis (XRD) of the positive active material made in the Preparation Example 2 was performed.

Figure 2:
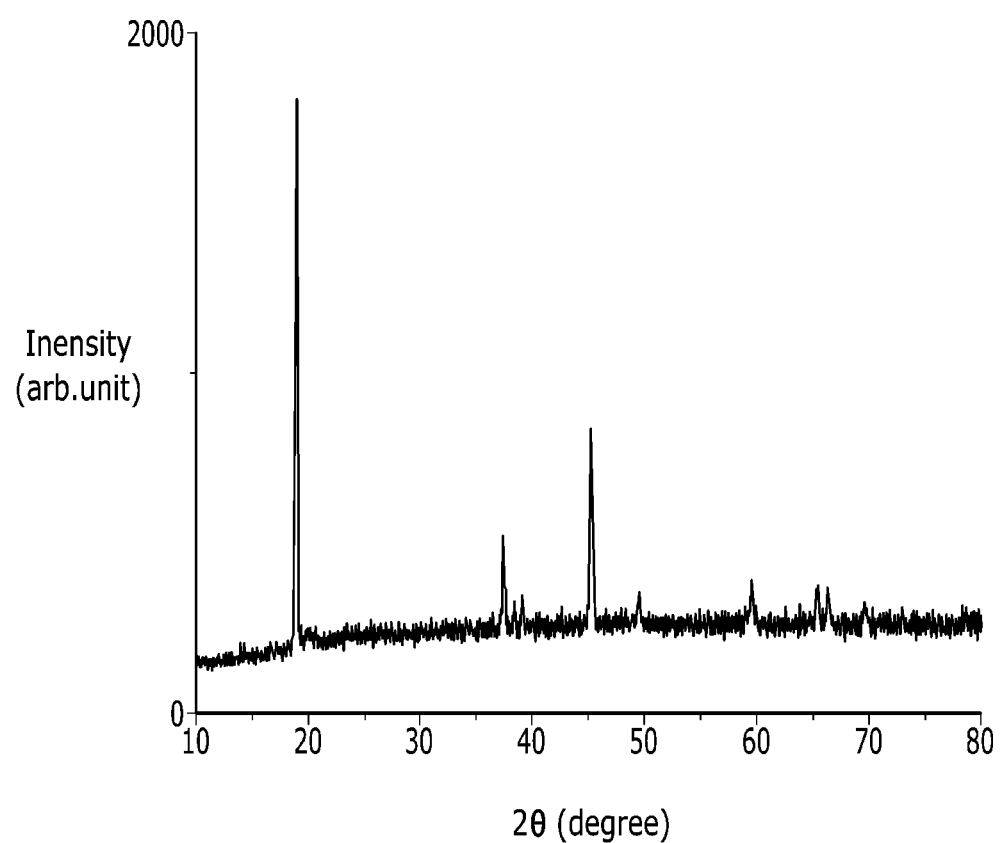
FIG. 2 is a graph showing an X-ray diffraction analysis (XRD) result of a positive active material made in Preparation Example 2.

FIG. 2 is a graph showing the X-ray diffraction analysis (XRD) result of the positive active material made in the Preparation Example 2.

Referring to FIG. 2, the positive active material made in the Preparation Example 2 had an equivalent crystal structure to the positive active material made in the Comparative Preparation Example 2.

Evaluation 2: XRD Analysis Depending on Charge Voltage

X-ray diffraction analysis (XRD) of the positive active material made in the Preparation Example 2 depending on charge voltage was performed.

Figure 3:
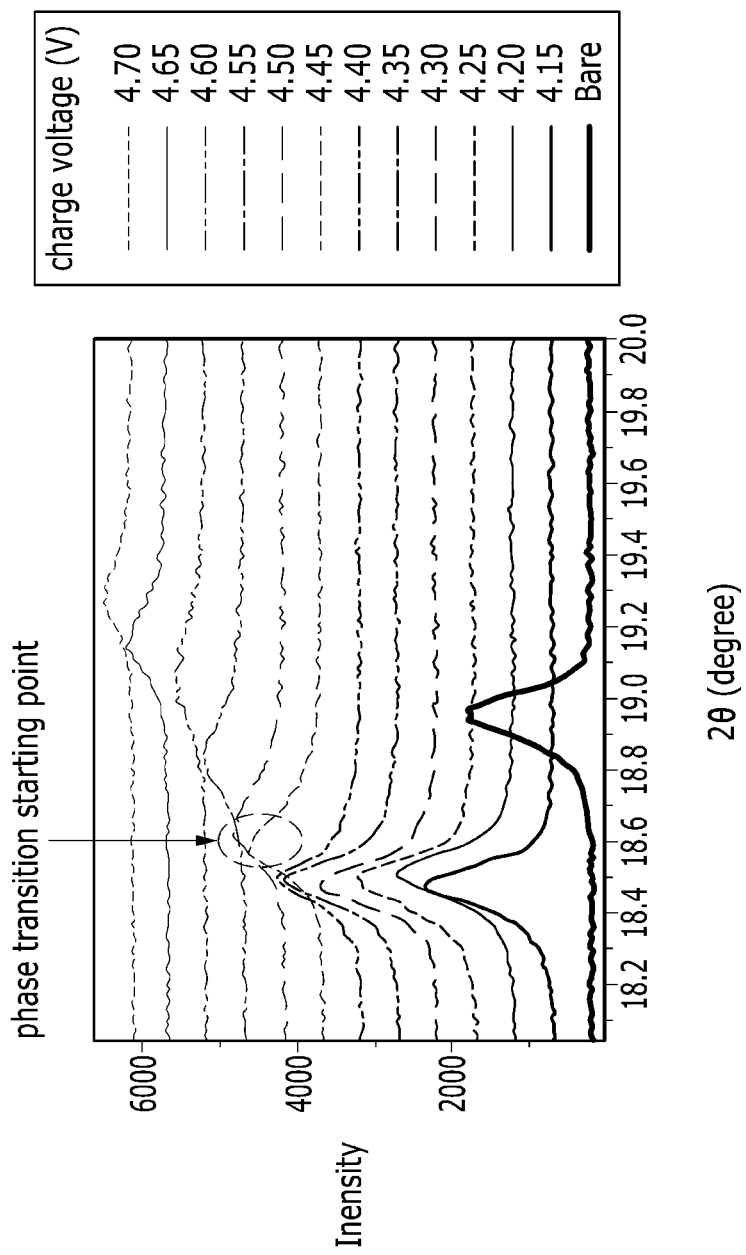
FIG. 3 is a graph showing an X-ray diffraction analysis (XRD) result of the positive active material prepared in Preparation Example 2 depending on a charge voltage.

FIG. 3 is a graph showing X-ray diffraction analysis (XRD) result of the positive active material made in the Preparation Example 2 depending on a charge voltage.

Referring to FIG. 3, the positive active material according to Preparation Example 2 generated a phase transition at a voltage of 4.50 V. The positive active material according to Comparative Preparation Examples 1 and 2 started a phase transition at 4.60 V, and thus, the positive active material according to one embodiment showed a phase change at a 0.1 V lower voltage.

Evaluation 3: Initial Capacity and Initial Efficiency of Rechargeable Lithium Battery Cell The rechargeable lithium battery cells according to Examples 1 to 4 and Comparative Examples 1 to 3 were charged and discharged at 25° C. in a range of 3.0 to 4.5 V at a 1.0 C-rate of current density, and their initial capacity and initial efficiency were measured and are provided in the following Table 1.

TABLE 1

|  | Initial charge capacity (mAh/g) | Initial discharge capacity (mAh/g) | Initial efficiency (%) |
| --- | --- | --- | --- |
| Example 1 | 215.30 | 181.18 | 84.15 |
| Example 2 | 223.57 | 164.73 | 73.68 |
| Example 3 | 204.56 | 190.71 | 93.23 |
| Example 4 | 206.32 | 188.01 | 91.13 |
| Comparative Example 1 | 200.34 | 191.34 | 95.50 |
| Comparative Example 2 | 201.20 | 192.97 | 96.32 |
| Comparative Example 3 | 200.52 | 191.84 | 95.67 |

Evaluation 4: Cycle-life Characteristics of Rechargeable Lithium Battery Cell

The rechargeable lithium battery cells according to Examples 1 to 4 and Comparative Examples 1 to 3 were charged and discharged 100 times at 25° C. within a range of 3.0V to 4.5V at a 1.0 C-rate of current density, and then, their cycle-life characteristics were measured and provided in the following Table 2.

In the following Table 2, capacity retention (%) of the rechargeable lithium battery cells was obtained as a percentage of discharge capacity after 100 cycles relative to initial discharge capacity.

TABLE 2

|  | Discharge capacity after 100 cycles (mAh/g) | Capacity retention (%) |
| --- | --- | --- |
| Example 1 | 154.65 | 85.36 |
| Example 2 | 136.00 | 82.56 |
| Example 3 | 164.28 | 86.14 |
| Example 4 | 161.10 | 85.69 |
| Comparative Example 1 | 142.28 | 74.36 |
| Comparative Example 2 | 147.33 | 76.35 |
| Comparative Example 3 | 144.32 | 75.23 |

Referring to Table 2, Examples 1 to 4 using the positive active material showed excellent cycle-life characteristics compared with Comparative Examples 1 to 3.

Evaluation 5: Output Characteristics of Rechargeable Lithium Battery Cell

The rechargeable lithium battery cells according to Examples 3 and 4 and Comparative Example 3 were charged and discharged at 25° C. within a range of 3.0V to 4.5 V range at each rate of 0.1 C, 0.2 C, 0.5 C and 1 C, and then, the high rate capability was measured and provided in the following Table 3.

In the following Table 3, the capacity retention (%) of the rechargeable lithium battery cells was obtained as a percentage of discharge capacity at each 0.2 C, 0.5 C and 1C relative to discharge capacity at 0.1 C.

TABLE 3

|  | C-rate discharge capacity (mAh/g) | | | | Capacity retention (%) | | |
| --- | --- | --- | --- | --- | --- | --- | --- |
|  | 0.1 C | 0.2 C | 0.5 C | 1 C | 0.2 C/ 0.1 C | 0.5 C/ 0.1 C | 1 C/ 0.1 C |
| Example 3 | 190.71 | 187.22 | 180.00 | 170.68 | 98.2 | 94.4 | 89.5 |
| Example 4 | 188.01 | 185.69 | 180.36 | 169.42 | 98.8 | 95.9 | 90.1 |
| Comparative Example 3 | 191.84 | 187.02 | 178.54 | 167.24 | 97.5 | 93.1 | 87.2 |

Referring to Table 3, Examples 3 and 4 using the positive active material described herein showed excellent rate capability, that is, excellent output characteristics compared with the Comparative Example 3.

EXAMPLE 5

The positive active material slurry was prepared by dissolving a fluoride binder (Guerra, Inc.) in N-methyl-2-pyrrolidone solvent and adding a mixture obtained by mixing the positive active material in the Preparation Example 1 and the positive active material in the Comparative Preparation Example 1 in a weight ratio of 8:2 and usingcarbon black as a conductive material thereto. Herein, the positive active material, the conductive material, and the binder were mixed in a weight ratio of 96:2:2. The slurry was coated on an aluminum foil and then, dried at 130° C. for 20 minutes, manufacturing a positive electrode.

On the other hand, the negative active material slurry was prepared by mixing 98 wt % of the negative active material obtained by mixing SiOx having an average particle diameter of 5 um and graphite in a weight ratio of 3:97, 1 wt % of carboxylmethyl cellulose, and 1 wt % of a styrene-butadiene rubber in water. The negative active material slurry was coated on a Cu foil and dried, manufacturing a negative electrode.

The positive and negative electrodes were used along with a polyethylene separator, manufacturing a rechargeable lithium battery cell. Herein, an electrolyte solution was prepared by mixing ethylene carbonate, dimethyl carbonate and diethyl carbonate in a volume ratio of 3:4:3 and dissolving 1.15 M $LiPF_6$ in the mixed solvent.

EXAMPLE 6

A rechargeable lithium battery cell was manufactured in accordance with the same method described in Example 5 except for mixing the positive active material in Preparation Example 2 and the positive active material in Comparative Preparation Example 1 in a weight ratio of 8:2.

COMPARATIVE EXAMPLE 4

A rechargeable lithium battery cell was manufactured according to the same method described in Example 5 except for mixing the positive active material in Comparative Preparation Example 1 and the positive active material in Comparative Preparation Example 2 in a weight ratio of 8:2.

Evaluation 6: Initial Capacity and Initial Efficiency of Rechargeable Lithium Battery Cell The rechargeable lithium battery cells according to Examples 5 and 6 and Comparative Example 4 were charged and discharged at 25° C. within a range of 3.0 to 4.5 V at a 1.0 C-rate of current density, and then, their initial capacity and initial efficiency were measured and provided in the following Table 4.

TABLE 4

| | Initial charge capacity (mAh/g) | Initial discharge capacity (mAh/g) | Initial efficiency (%) |
|---|---|---|---|
| Example 5 | 194.28 | 174.00 | 89.56 |
| Example 6 | 196.76 | 175.62 | 89.26 |
| Comparative Example 4 | 191.84 | 172.16 | 89.74 |

Evaluation 7: Cycle-life Characteristics of Rechargeable Lithium Battery Cell

The rechargeable lithium battery cells according to Examples 5 and 6 and Comparative Example 4 were 100 times charged and discharged at 25° C. within a range of 3.0V to 4.5 V at a 1.0 C-rate of current density, and their cycle-life characteristics were measured and provided in the following Table 5.

In the following Table 5, the capacity retention (%) of the rechargeable lithium battery cells was obtained as a percentage of discharge capacity after 100 cycles relative to initial discharge capacity.

TABLE 5

| | Discharge capacity after 100 cycles (mAh/g) | Capacity retention (%) |
|---|---|---|
| Example 5 | 160.69 | 92.35 |
| Example 6 | 161.13 | 91.75 |
| Comparative Example 4 | 127.90 | 74.29 |

Referring to Table 5, Examples 5 and 6 using the positive active material described herein showed excellent cycle-life characteristics compared to the Comparative Example 4.

While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims. Therefore, the aforementioned embodiments should be understood to be exemplary but not limiting the present invention in any way. In the present disclosure, the terms "Example" and "Comparative Example" are used to identify a particular example or experimentation and should not be interpreted as admission of prior art.

What is claimed is:

1. A positive active material for a rechargeable lithium battery, comprising a mixture of
    a compound represented by the following Chemical Formula 1:

$$Li_xCo_{1-y}Ti_yO_{2.00}$$ [Chemical Formula 1]

wherein $1.03 \leq x \leq 1.1$ and $0.02 \leq y \leq 0.05$; and
    a lithium metal compound represented by Chemical Formula 2:

$$Li_aCoO_{2.00},$$ [Chemical Formula 2]

wherein $0.90 < a \leq 1.80$;
    wherein the compound represented by Chemical Formula 2 is different from the compound represented by the Chemical Formula 1;
    wherein the lithium metal compound is present in an amount between about 50 wt % to about 95 wt % based on the total amount of the positive active material; and
    wherein the compound of Chemical Formula 1 and the lithium metal compound of Chemical Formula 2 are mixed together with a polymer binder.

2. The positive active material for a rechargeable lithium battery of claim 1, wherein y is $0.03 \leq y \leq 0.05$.

3. The positive active material for a rechargeable lithium battery of claim 1, wherein the compound represented by the above Chemical Formula 1 forms a particle having an average particle diameter measured as D50 between about 3 μm to about 17 μm.

4. The positive active material for a rechargeable lithium battery of claim 3, wherein the compound represented by the above Chemical Formula 1 forms a particle having an average particle diameter measured as D50 in the range of about 3 μm to about 7 μm.

5. The positive active material for a rechargeable lithium battery of claim 4, wherein the compound represented by the above Chemical Formula 1 forms a particle having an average particle diameter measured as D50 of about 5 μm.

6. The positive active material for a rechargeable lithium battery of claim 3, wherein the compound represented by the above Chemical Formula 1 forms a particle having an average particle diameter measured as D50 in the range of about 13 μm to about 17 μm.

7. The positive active material for a rechargeable lithium battery of claim 1, wherein the compound represented by the above Chemical Formula 1 is $Li_{1.069}Co_{0.98}Ti_{0.02}O_{2.00}$.

8. The positive active material for a rechargeable lithium battery of claim 1, wherein the compound represented by the above Chemical Formula 1 is $Li_{1.087}Co_{0.961}Ti_{0.039}O_{2.00}$.

9. The positive active material for a rechargeable lithium battery of claim 1, wherein the positive active material is a mixture of $Li_{1.069}Co_{0.98}Ti_{0.02}O_{2.00}$ and $Li_{1.05}CoO_{2.00}$ mixed at a weight ratio of 8:2.

10. The positive active material for a rechargeable lithium battery of claim 1, wherein the positive active material is a mixture of $Li_{1.087}Co_{0.961}Ti_{0.039}O_{2.00}$ and $Li_{1.05}CoO_{2.00}$ mixed at a weight ratio of 8:2.

11. A rechargeable lithium battery, comprising
    the positive electrode including a positive active material of claim 1;
    a negative electrode including a negative active material; and
    an electrolyte solution.

12. The rechargeable lithium battery of claim 11, wherein the negative active material comprises a silicon-based material.

* * * * *